United States Patent
Kawakubo

(10) Patent No.: US 7,433,534 B2
(45) Date of Patent: Oct. 7, 2008

(54) EDGE EMPHASIZING CIRCUIT

(75) Inventor: Takuji Kawakubo, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 672 days.

(21) Appl. No.: 10/444,305

(22) Filed: May 23, 2003

(65) Prior Publication Data

US 2003/0219168 A1  Nov. 27, 2003

(30) Foreign Application Priority Data

May 27, 2002 (JP) .............................. 2002-152923

(51) Int. Cl.
 *G06K 9/40* (2006.01)
 *H04N 5/208* (2006.01)
(52) U.S. Cl. ..................... 382/266; 382/260; 348/252
(58) Field of Classification Search ................ 382/260, 382/266, 162–167, 199–200, 263; 345/611; 358/1.9; 348/252
See application file for complete search history.

(56) References Cited

U.S. PATENT DOCUMENTS

| | | | | |
|---|---|---|---|---|
| 6,055,340 A * | 4/2000 | Nagao | .......................... | 382/261 |
| 6,148,116 A * | 11/2000 | Park et al. | .................... | 382/266 |
| 6,392,759 B1 * | 5/2002 | Kuwata et al. | ................ | 358/1.9 |
| 6,476,876 B1 * | 11/2002 | Matsunaga et al. | ........... | 348/625 |
| 6,590,617 B1 * | 7/2003 | Kanai et al. | ................... | 348/625 |
| 6,614,474 B1 * | 9/2003 | Malkin et al. | ................ | 348/252 |
| 6,628,330 B1 * | 9/2003 | Lin | .............................. | 348/252 |
| 6,640,017 B1 * | 10/2003 | Tsai et al. | .................... | 382/266 |
| 6,757,427 B1 * | 6/2004 | Hongu | ......................... | 382/164 |
| 6,850,275 B1 * | 2/2005 | Minakami | .................... | 348/252 |
| 6,876,777 B2 * | 4/2005 | Liu | .............................. | 382/266 |
| 6,879,728 B1 * | 4/2005 | Fisher et al. | ................. | 382/254 |
| 6,891,549 B2 * | 5/2005 | Gold | ............................ | 345/611 |
| 6,904,169 B2 * | 6/2005 | Kalevo et al. | ................ | 382/167 |

FOREIGN PATENT DOCUMENTS

| | | |
|---|---|---|
| JP | 01-220585 | 9/1989 |
| JP | 10-210298 | 8/1998 |
| JP | 10-229546 | 8/1998 |

* cited by examiner

*Primary Examiner*—Andrae S. Allison
(74) *Attorney, Agent, or Firm*—Gerald T. Bodner

(57) ABSTRACT

An edge emphasizing circuit includes a weighing addition circuit, and the weighing addition circuit performs on the basis of a weighing coefficient applied from a coefficient calculating circuit a weighing addition with respect to raw image data and data obtained by performing a filtering process on the raw image data by a median filter. Then, an aperture signal producing circuit produces an aperture signal on the basis of a result of the weighing addition. The aperture signal is in an adder superimposed on Y data output from a signal processing circuit, whereby an edge component of the Y data is emphasized.

5 Claims, 2 Drawing Sheets

| R | G | R | G | R | G | R | G |   | R | G |
|---|---|---|---|---|---|---|---|---|---|---|
| G | B | G | B | G | B | G | B |   | G | B |
| R | G | R | G | R | G | R | G |   | R | G |
| G | B | G | B | G | B | G | B |   | G | B |
| R | G | R | G | R | G | R | G |   | R | G |
|   |   |   |   |   |   |   |   |   |   |   |
| R | G | R | G | R | G | R | G |   | R | G |
| G | B | G | B | G | B | G | B |   | G | B |

50 points to the G in row 3, column 4.

| G1 |    | G2 |
|----|----|----|
|    | G0 |    |
| G3 |    | G4 |

EDGE EMPHASIZING CIRCUIT

BACKGROUND OF THE INVENTION

1. Field of the Invention

The present invention relates to an edge emphasizing circuit. More specifically, the present invention relates to an edge emphasizing circuit which is applied to a digital camera, for example, and produces an edge emphasizing signal by performing weighing addition with respect to a first pixel signal output from an imager and a second pixel signal obtained by performing a filtering process on the first pixel signal.

2. Description of the Prior Art

As one image processing technique in a digital camera, there is an edge emphasizing for emphasizing an edge portion of an image. This is a technique that an edge (high-frequency) component of an image signal output from an image sensor is extracted, and an aperture signal is produced by applying an aperture gain to the extracted edge component and superimposed on the image signal. For the purpose of extracting the edge component in such the edge emphasizing, conventionally, the image signal is directly subjected to an edge extracting process.

However, in the above-described prior art, in a case a relatively high-frequency noise component is included in the image signal, the noise component is also extracted together with the edge component. Consequently, there is a problem that since the aperture gain is also applied to the extracted noise component, not only the edge component but also the noise component is emphasized, and therefore, an image quality is deteriorated.

SUMMARY OF THE INVENTION

Therefore, it is a primary object of the present invention to provide a novel edge emphasizing circuit.

Another object of the present invention is to provide an edge emphasizing circuit capable of realizing a high-quality edge emphasizing.

The present invention is an edge emphasizing circuit which produces an edge emphasizing signal by performing a weighing addition with respect to a first pixel signal output from an imager and a second pixel signal obtained by performing a filtering process on the first pixel signal, comprises: a detector for detecting a level variation of the first pixel signal; and a weighing controller which makes an amount of the weighing with respect to the first pixel signal larger as the level variation becomes larger.

In this invention, by performing the weighing addition on the first pixel signal output from the imager and the second pixel signal obtained by performing the filtering process on the first pixel signal, the edge emphasizing signal is produced. Herein, in a case an edge portion of an object exists in a position of a pixel, for example, the first pixel signal corresponding to the pixel indicates a relatively large level variation. On the other hand, the first pixel signal corresponding to a pixel located in an approximate flat portion of the object shows only a small level variation. The level variation of the first pixel signal is detected by the detector. The weighing controller increases a weighing amount with respect to the first pixel signal as the detected level variation is large. That is, the edge emphasizing signal at the edge portion of the object is produced by the weighing addition performing the addition by a large weighing amount on a so-called original first pixel signal output from the imager. Then, the edge emphasizing signal in the approximate flat portion of the object is produced by the weighing addition performing the addition by a large weighing amount on the second pixel signal from which a noise component is reduced by the filtering process.

It is noted that a median filtering process can be used as the filtering process.

Furthermore, it is desirable that the first pixel signal is a signal having color information of green.

In addition, a producer for producing a luminance signal on the basis of the first pixel signal and an adder for adding the edge emphasizing signal to the luminance signal may be provided.

According to the present invention, the edge emphasizing signal in the edge portion of the object can be produced by the weighing addition performing the addition by the large weighing amount on the original first pixel signal output from the imager, and therefore, it is possible to more emphasize the edge portion. On the other hand, the edge emphasizing signal in the approximate flat portion of the object is produced by the weighing addition performing the addition by the large weighing amount on the second pixel signal obtained by reducing the noise component from the first pixel signal, and therefore, it is possible to reduce an influence of the noise component in the approximate flat portion. Accordingly, it is possible to realize the high-quality edge emphasizing than ever.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
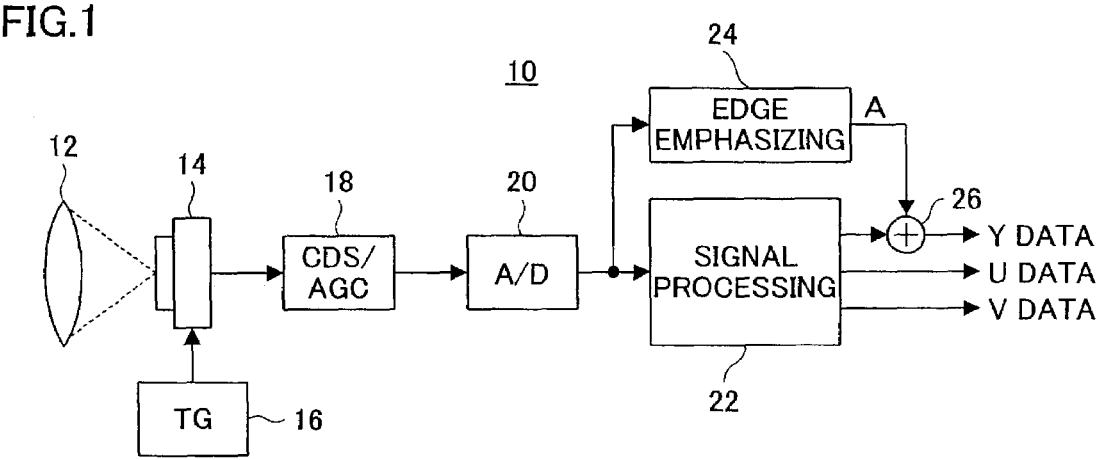
FIG. 1 is a block diagram showing a schematic configuration of one embodiment of the present invention.

Referring to FIG. 1, a digital camera 10 of this embodiment has a CCD (Charge Coupled Device) type image sensor 14 to which an optical image of an object is incident through an optical lens 12. The image sensor 14 exposes the optical image of the object according to a timing signal applied from a TG (Timing Generator) 16 and outputs an image signal depending upon charges stored by the exposure.

The image signal output from the image sensor 14 is input to a CDS (Correlated Double Sampling)/AGC (Automatic Gain Control) circuit 18 so as to be subjected to a correlated double sampling process and an amplifying process and then, input to an A/D converter 20. The A/D converter 20 converts the input image signal into image data being a digital signal and input to a signal processing circuit 22 the converted image data. The signal processing circuit 22 performs a predetermined process such as color separation, white balance adjustment, gamma correction, YUV conversion and etc. and then, input to a video encoder and a compression circuit (both not shown) Y (luminance) data, U (blue color difference) data, and V (red color difference) data generated by the YUV conversion. Thus, a through image of the object is eventually displayed on a screen of a liquid crystal monitor (not shown), and a compressed image file is recorded on a memory card (not shown).

Furthermore, the digital camera 10 of this embodiment is provided with an edge emphasizing circuit 24 to which the image data converted by the A/D converter 20 is input. The edge emphasizing circuit 24 produces an aperture signal A from the input image data. The produced aperture signal A is input to an adder 26 so as to be added to (superimposed on) the Y data output from the signal processing circuit 22. Thus, an edge component of the Y data is emphasized, that is, edge emphasizing is realized.

Figure 2:
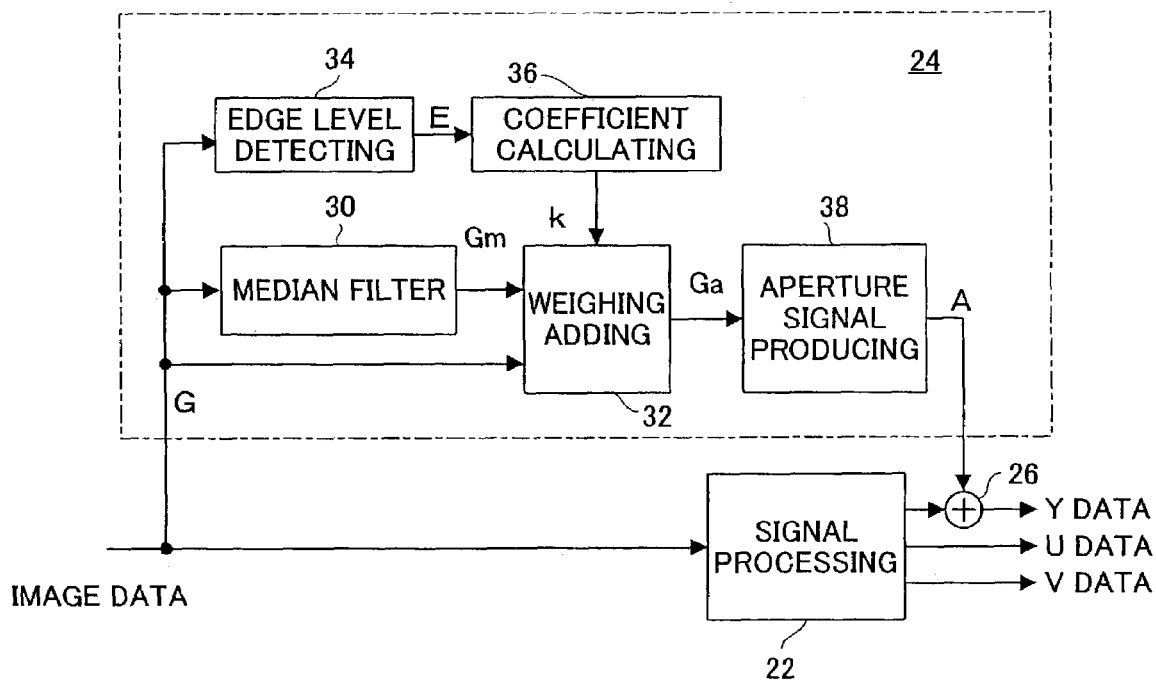
FIG. 2 is a block diagram showing a detailed configuration of an edge emphasizing circuit in FIG. 1.

More specifically, as shown in FIG. 2, the edge emphasizing circuit 24 includes a median (mid-value) filter 30, a weighing addition circuit 32, an edge level detection circuit 34, a coefficient calculating circuit 36 and an aperture signal producing circuit 38. The image data converted by the A/D converter 20 is input to the median filter 30, the weighing addition circuit 32 and the edge level detection circuit 34, respectively out of them.

Figures 3, 4, 5:
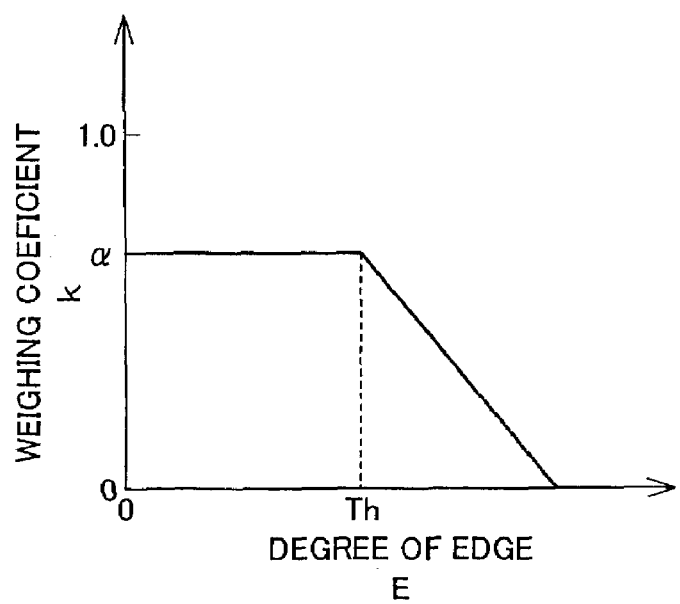
FIG. 3 is an illustrative view conceptionally showing color components of pixel data included in image data in FIG. 1 embodiment.
FIG. 4 is an illustrative view for explaining a processing content of an image signal within the edge emphasizing circuit in FIG. 2.
FIG. 5 is a graph showing a relationship between degree of an edge and a weighing coefficient in FIG. 1 embodiment.

It is noted that the image data converted by the A/D converter 20 includes a plurality of pixel data each having any one of color components R (Red), G (Green), and B (Blue) as shown in FIG. 3. The color components of these pixel data are corresponding to color elements of a primary filter (not shown) provided on a light-receiving surface of the image sensor 14.

Specifically, FIG. 3 is for conceptually showing the color components of each of pixel data in correspondence to an arrangement of respective pixels (light-receiving elements) of the image sensor 14. Paying attention to a vertical line, pixel data of the R component and pixel data of the G component are alternately arranged in the vertical line. Then, pixel data of the G component and pixel data of the B component are alternately arranged in another vertical line adjacent to the vertical line. Furthermore, as shown in a heavy line-frame 50 in FIG. 3, paying attention to arbitrary 4 pixels of 2 rows×2 columns, the pixel data of the G component is arranged on one diagonal line of the frame 50, and the pixel data of the R component and the B component are arranged on the other diagonal line of the frame 50.

Returning to FIG. 2, the median filter 30 performs a 3×3 filtering process on the pixel data of the G component out of the plurality of pixel data included in the image data. That is, the median filter 30, as shown in FIG. 4, makes an arbitrary G pixel (a pixel to which a color element of G is assigned) a target pixel G0, and a median of the pixel data of the target pixel G0 and four G pixels G1 to G4 surrounding the target pixel G0, i.e., the third largest pixel data from top (or bottom) is specified. Then, the specified pixel data is set as the pixel data of the target pixel G0. The filtering process is performed on all the G pixels other than the G pixels existing at the edge of the image sensor 14. It is noted that as to the pixel data of the G pixel existing at the edge of the image sensor 14, the data is retained as it is.

Through this filtering process by the median filter 30, a noise component included in the image data (pixel data of the G component) is reduced. The image data Gm on which the filtering process has been performed is input to the weighing addition circuit 32.

The weighing addition circuit 32 performs a weighing addition shown in a following equation 1 with respect to the image data Gm on which the filtering process has been performed, and the image data input from the A/D converter 20, so-called raw image data.

$$Ga = Gm \cdot k + G \cdot (1-k) \quad (1)$$

Herein, Gm is the pixel data of the G component on which the filtering process has been performed, and G is the pixel data of the G component included in the raw image data. Then, k is a weighing coefficient. The weighing coefficient k is evaluated by a following process.

First, the edge level detection circuit 34 performs an arithmetic operation shown by an equation 2 with respect to the pixel data of G component out of the raw image data input from the A/D converter 20.

$$E = |\{(G0-G1)/2\} + \{(G0-G2)/2\} + \{(G0-G3)/2\} + \{(G0-G4)/2\}| = |2 \cdot G0 - (G1+G2+G3+G4)/2| \quad (2)$$

Herein, G0 is the pixel data of the target pixel G0 in FIG. 4, and G1 to G4 are pixel data of four surround pixels G1 to G4 surrounding the target pixel G0.

As can be understood from the equation 2, the edge level detection circuit 34 evaluates an absolute value of a sum of values obtained by dividing differences between the pixel data of the target pixel G0 and the pixel data of the surround pixels G1 to G4 by 2. Herein, if an edge portion of the object exists at a position of the target pixel G0, for example, an arithmetic operation result E by the edge level detection circuit 34 becomes a relatively large value. On the other hand, if the target pixel G0 and the respective surround pixels G1 to G4 are located at a flat portion of the object, the operation result E takes a relatively small value and becomes equal to zero in the extreme. In other words, the edge level detection circuit 34 detects degree of the edge of the object, that is, evenness of the object.

The detection result by the edge level detection circuit 34, i.e, data E indicative of the degree of the edge is input to the coefficient calculating circuit 36. The coefficient calculating circuit 36 calculates the above-described weighing coefficient k on the basis of the input data E. Equations for evaluating the weighing coefficient k are as follows.

$$k = \alpha; \ E \leq Th$$

$$k = \alpha - (E-Th) \cdot \beta; \ E > Th \quad (3)$$

Herein, $\alpha$, $\beta$, and Th take constant values, respectively.

A graphical expression of a relationship between the data E shown in the equation 3 and the weighing coefficient k is as shown in FIG. 5. In other words, when a value of the data E is equal to or less than a threshold value Th, the weighing coefficient k takes a fixed value $\alpha$. On the other hand, when the value of the data E exceeds the threshold value Th, the weighing coefficient k is smaller than $\alpha$, and the larger the value of the data E is, i.e., the larger the degree of the edge of the object is, the smaller the weighing coefficient k is.

The weighing coefficient k thus calculated is applied to the weighting addition circuit 32. The weighting addition circuit 32 performs the weighing addition of the above-described equation 1 by use of the applied weighing coefficient k. According to the equation 1, the larger the weighing coefficient k is, i.e., the smaller the degree of the edge is, the larger rate of the weighing addition with respect to the image data (Gm) on which the filtering process has been performed by the filter 30 is. On the other hand, the smaller the weighing coefficient k is, i.e., the larger the degree of the edge is, the larger the rate or amount of weighing with respect to the raw image data (G) is. The data Ga on which the weighing addition by the weighing addition circuit 32 has been performed is input to the aperture signal producing circuit 38.

The aperture signal producing circuit 38 extracts an edge component of the input data Ga and produces an aperture signal A by applying an aperture gain to the edge component. A series of processes by the aperture signal producing circuit 38 is realized by the well known technique. The produced aperture signal A is superimposed on the Y data output from the signal processing circuit 22 in the adder 26 described above, and whereby, the edge component of the Y data is emphasized.

As can be understood from the above description, in this embodiment, the aperture signal A is produced on the basis of the weighing addition result Ga between the raw image data (G) and the image data (Gm) on which the filtering process by the median filter 30 has been performed. Then, since the aperture signal A superimposed on the edge portion of the object is produced on the basis of the weighing addition result Ga making the weighing rate or amount with respect to the raw image data (G) larger, it is possible to more emphasize the edge portion. On the other hand, since the aperture signal A superimposed on the flat portion of the object is produced on the basis of the weighing addition result Ga making the weighing rate or amount with respect to the image data (Gm) on which the filtering process has been performed larger, it is possible to reduce an influence of the noise component at the flat portion of the object image That is, it is possible to realize high-quality edge emphasizing.

It is noted that although a description is made on a case that the present invention is applied to the digital camera 10, it is not limited thereto. In other words, the present invention may be applied to various devices such as a video camera, a video switcher and etc. each dealing with an image signal.

Furthermore, although the aperture signal A is produced on the basis of the image data of the G component, the aperture signal A may be produced on the basis of the image data of the R component or the B component. However, since a luminance component having the largest influence on an edge emphasizing effect is included in the image data of the G component, the largest edge emphasizing effect can be obtained by producing the aperture signal A on the basis of the image data of the G component.

Furthermore, another non-linear filter such as maximum value filter, minimum value filter, averaged value filter, steep filter and etc. may be used in place of the median filter 30. In addition, a linear filter may be used without being restricted to the non-linear filter.

Then, although the degree E of the edge is detected on the basis of the above-described equation 2 in the edge level detection circuit 34, the degree E of the edge may be calculated by a computing equation other than the equation 2. Furthermore, a relationship between the degree E of the edge and the weighing coefficient k is not limited to a relationship shown in FIG. 5 (equation 3).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An edge emphasizing circuit, comprising:
   a filter which performs a filtering process on pixel data of a noted pixel forming raw image data representative of an object scene image so as to output processed pixel data;
   a first creator which creates edge emphasizing data by subjecting to a weighted adding process the pixel data of the noted pixel forming the raw image data and the processed pixel data;
   a second creator which creates luminance data based on the raw image data;
   an adder which adds the edge emphasizing data created by said first creator to the luminance data created by said second creator;
   a detector which detects a degree of an edge of a portion of the object scene image including the noted pixel out of the object scene image based on the pixel data of the noted pixel and pixel data of surround pixels which surround the noted pixel; and
   a controller which controls said first creator based on a detection result of said detector such that a weighting amount added to the processed pixel data increases as the degree of the edge of the portion of the object scene image decreases.

2. An edge emphasizing circuit according to claim 1, wherein said filtering process is a median filtering process.

3. An edge emphasizing circuit according to claim 1, wherein the noted pixel is a pixel having color information of green.

4. An edge emphasizing circuit according to claim 2, wherein the noted pixel is a pixel having color information of green.

5. An edge emphasizing circuit according to claim 1, wherein any one of a plurality of colors is assigned to each pixel forming the raw image data, and a color assigned to each of the surround pixels is consistent with a color assigned to the noted pixel.

* * * * *